US012581243B2

(12) United States Patent
Lee et al.

(10) Patent No.: US 12,581,243 B2
(45) Date of Patent: Mar. 17, 2026

(54) VIBRATION DAMPING LOUDSPEAKER

(71) Applicant: FORTUNE GRAND TECHNOLOGY INC., Taoyuan City (TW)

(72) Inventors: Ping-Yu Lee, Taoyuan City (TW); Jian Lv, Taoyuan City (TW); Chuan He, Taoyuan City (TW); Ming-Jun Zeng, Taoyuan City (TW); Hong-Sheng Zhang, Taoyuan City (TW); De-Wu Wang, Taoyuan City (TW); Zhi-Long Niu, Taoyuan City (TW)

(73) Assignee: FORTUNE GRAND TECHNOLOGY INC., Taoyuan City (TW)

(*) Notice: Subject to any disclaimer, the term of this patent is extended or adjusted under 35 U.S.C. 154(b) by 163 days.

(21) Appl. No.: 18/747,473

(22) Filed: Jun. 19, 2024

(65) Prior Publication Data

US 2024/0430621 A1 Dec. 26, 2024

(30) Foreign Application Priority Data

Jun. 20, 2023 (CN) ......................... 202310739036.0
Jul. 19, 2023 (CN) ......................... 202310893376.9

(51) Int. Cl.

| | |
|---|---|
| ***H04R 9/04*** | (2006.01) |
| ***H04R 7/04*** | (2006.01) |
| ***H04R 9/02*** | (2006.01) |
| ***H04R 9/06*** | (2006.01) |

(52) U.S. Cl.
CPC ............... *H04R 9/043* (2013.01); *H04R 7/04* (2013.01); *H04R 9/025* (2013.01); *H04R 9/045* (2013.01); *H04R 9/06* (2013.01); *H04R 2400/11* (2013.01)

(58) Field of Classification Search
CPC .......... H04R 9/043; H04R 7/04; H04R 9/025; H04R 9/045; H04R 9/06; H04R 2400/11
USPC ......................... 381/404, 150, 396, 400, 403
See application file for complete search history.

(56) References Cited

U.S. PATENT DOCUMENTS

2012/0051557 A1* 3/2012 Horigome .............. H04R 9/047 381/86
2018/0070160 A1* 3/2018 Concorso ................. H04R 9/06
2022/0070576 A1* 3/2022 Della Rosa ............ H04R 1/021
2022/0150619 A1* 5/2022 Park ..................... H04R 1/2819

* cited by examiner

*Primary Examiner* — Thjuan K Addy

(57) ABSTRACT

A vibration damping loudspeaker includes a sound-generating unit, a magnetic member, an assembly-auxiliary frame and dampers. Aligning units of the assembly-auxiliary frame are coupled to positioning units of the sound-generating unit. The dampers are symmetrically disposed between the magnetic member and the assembly-auxiliary frame. The sound-generating unit and the magnetic member can be quickly and easily mounted in place because of the assembly-auxiliary frame to not only enhance the production yield of the vibration damping loudspeaker but also allow the dampers to function as a buffer between the sound-generating unit and the magnetic member, so as to achieve vibration damping and vibration isolation during the operation of the vibration damping loudspeaker to spare users the discomfort they will otherwise experience for using electronic devices.

16 Claims, 18 Drawing Sheets

VIBRATION DAMPING LOUDSPEAKER

CROSS-REFERENCE TO RELATED APPLICATION

This non-provisional application claims priority under 35 U.S.C. § 119 (a) on Patent Application No(s). 202310739036.0 filed in China on Jun. 20, 2023 and Patent Application No(s). 202310893376.9 filed in China on Jul. 19, 2023, the entire contents of which are hereby incorporated by reference.

BACKGROUND OF THE INVENTION

1. Field of the Invention

The present disclosure relates to vibration damping loudspeakers, and in particular to a vibration damping loudspeaker that can be assembled quickly and easily to enhance production yield, increase rated power, and achieve vibration damping and vibration isolation in operation to spare users the discomfort they will otherwise experience for using electronic devices.

2. Description of the Related Art

A conventional loudspeaker typically has a magnetic member usually provided in the form of a single-magnet structure. The magnetic member is fixedly fitted to a speaker base of the loudspeaker. There is not any design of a buffer between the speaker base and the magnetic member. As a result, the vibration of the loudspeaker in operation is directly transmitted to a casing of an electronic device on which the loudspeaker is mounted, causing discomfort to persons using the electronic device.

Therefore, it is necessary to provide a vibration damping loudspeaker that can be quickly and easily assembled to enhance its production yield, increase its rated power, and achieve vibration damping and vibration isolation while the loudspeaker is operating to spare users the discomfort they will otherwise experience for using electronic devices.

BRIEF SUMMARY OF THE INVENTION

In view of the aforesaid drawbacks of the prior art, it is an objective of the disclosure to provide a vibration damping loudspeaker having a sound-generating unit and a magnetic member that can be quickly and easily mounted in place to increase the production yield, achieving spider-based ventilation, being able to operate at a high rated power, and having dampers functioning as a buffer between the sound-generating unit and the magnetic member, so as to achieve vibration damping and vibration isolation during the operation of the vibration damping loudspeaker to spare users the discomfort they will otherwise experience for using electronic devices.

To achieve the above and other objectives, the disclosure provides a vibration damping loudspeaker comprising a sound-generating unit, a magnetic member, an assembly-auxiliary frame and a plurality of dampers. The sound-generating unit comprises a speaker base, a diaphragm and a voice coil. The speaker base has a plurality of positioning units. The diaphragm is disposed at the speaker base. The voice coil is connected to the diaphragm. The magnetic member comprises a main magnetic plate and a magnetic unit. The magnetic unit is disposed on a top surface of the main magnetic plate. The voice coil is movably disposed outside the magnetic unit. The assembly-auxiliary frame has a plurality of aligning units and is disposed outside the magnetic member. The aligning units are coupled to the positioning units respectively to allow the assembly-auxiliary frame to be mounted on the speaker base. The dampers are symmetrically disposed between the main magnetic plate and the assembly-auxiliary frame.

In the vibration damping loudspeaker, two short-side sides of the main magnetic plate each have a transverse short-side magnetic plate, and the dampers are symmetrically disposed between the transverse short-side magnetic plates and two short-side sides of the assembly-auxiliary frame.

In the vibration damping loudspeaker, the dampers each have a plurality of first fitting portions, whereas the assembly-auxiliary frame and the transverse short-side magnetic plates each have at least a second fitting portion, with the first fitting portions coupled to the second fitting portions respectively.

In the vibration damping loudspeaker, two long-side sides of the main magnetic plate each have a longitudinal long-side magnetic plate, and the voice coil is movably disposed between the magnetic unit and the longitudinal long-side magnetic plate.

In the vibration damping loudspeaker, two short-side sides of the speaker base each have an electrically conductive sheet, the electrically conductive sheets each having a first electrode and a second electrode, the first electrodes each being disposed at the top of the speaker base, the second electrodes each being disposed at the bottom of the speaker base, two short-side sides of the assembly-auxiliary frame each having a first dent, and the transverse short-side magnetic plates each having a second dent, with the second electrodes disposed at the first dents respectively, the first dents disposed at the second dents respectively, and the voice coil electrically connected to the first electrodes.

The vibration damping loudspeaker further comprises at least a spider disposed between the speaker base and the voice coil.

In the vibration damping loudspeaker, the main magnetic plate, the dampers and the assembly-auxiliary frame are integrally formed by injection molding.

In the vibration damping loudspeaker, the dampers are made of silicone and have hardness of 40 to 60 degrees.

In the vibration damping loudspeaker, rigidity of the assembly-auxiliary frame is greater than rigidity of the speaker base.

In the vibration damping loudspeaker, the spiders are disposed between two short-side sides of the speaker base and two short-side sides of the voice coil and are symmetrically arranged, with the main magnetic plate having two longitudinal long-side magnetic plates, the dampers are disposed between the longitudinal long-side magnetic plates of the main magnetic plate and two long-side sides of the assembly-auxiliary frame, the assembly-auxiliary frame having two downward-concave short-side sides so as to be connected between the long-side sides of the assembly-auxiliary frame.

In the vibration damping loudspeaker, the downward-concave short-side sides and the main magnetic plate lie at the same horizontal position.

In the vibration damping loudspeaker, the dampers each have a first fitting unit and a second fitting unit, the longitudinal long-side magnetic plates of the main magnetic plate each have at least a third fitting unit, and the long-side sides of the assembly-auxiliary frame each have at least a fourth fitting unit, with the first fitting unit fitted to the third fitting unit, and the second fitting unit fitted to the fourth fitting unit.

In the vibration damping loudspeaker, the longitudinal long-side magnetic plates of the main magnetic plate, the dampers and the long-side sides of the assembly-auxiliary frame are integrally formed by injection molding.

In the vibration damping loudspeaker, the spiders are disposed between two short-side sides of the speaker base and two short-side sides of the voice coil and are symmetrically arranged, and the main magnetic plate has two longitudinal long-side magnetic plates and two transverse short-side magnetic plates, the transverse short-side magnetic plates being of a smaller thickness than the main magnetic plate, the assembly-auxiliary frame having two upward-convex short-side sides so as to be connected between two long-side sides of the assembly-auxiliary frame, and the dampers are disposed between the transverse short-side magnetic plates of the main magnetic plate and the upward-convex short-side sides of the assembly-auxiliary frame.

In the vibration damping loudspeaker, the dampers each have a fifth fitting unit and a sixth fitting unit, the transverse short-side magnetic plates of the main magnetic plate each have a seventh fitting unit, and the upward-convex short-side sides of the assembly-auxiliary frame each have an eighth fitting unit, with the fifth fitting unit fitted to the seventh fitting unit, and the sixth fitting unit fitted to the eighth fitting unit.

In the vibration damping loudspeaker, the transverse short-side magnetic plates of the main magnetic plate, the dampers and the upward-convex short-side sides of the assembly-auxiliary frame are integrally formed by injection molding.

Therefore, the vibration damping loudspeaker of the disclosure has a sound-generating unit and a magnetic member that can be quickly and easily mounted in place because of an assembly-auxiliary frame to increase the production yield, achieves spider-based ventilation, can operate at a high rated power, and has dampers functioning as a buffer between the sound-generating unit and the magnetic member, so as to achieve vibration damping and vibration isolation during the operation of the vibration damping loudspeaker to spare users the discomfort they will otherwise experience for using electronic devices.

DETAILED DESCRIPTION OF THE INVENTION

Figure 1:
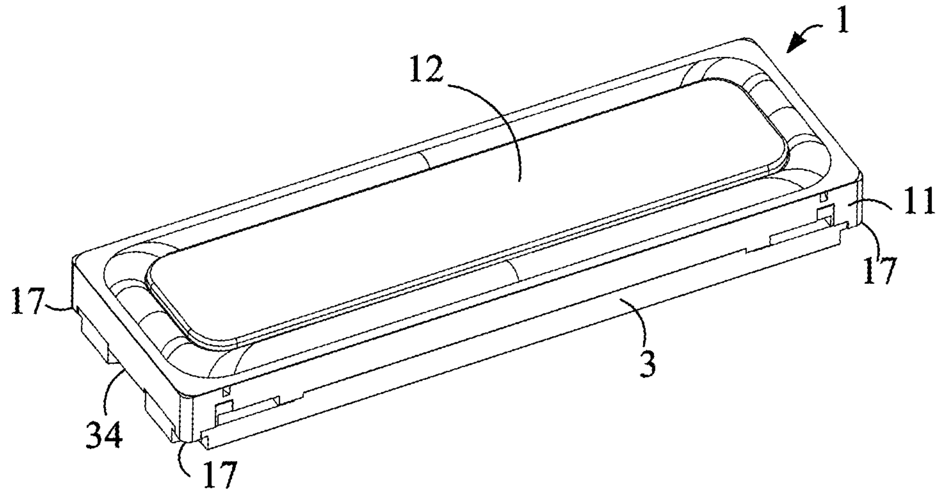
FIG. 1 is a perspective view of a vibration damping loudspeaker according to the first embodiment of the disclosure.
Figure 2:
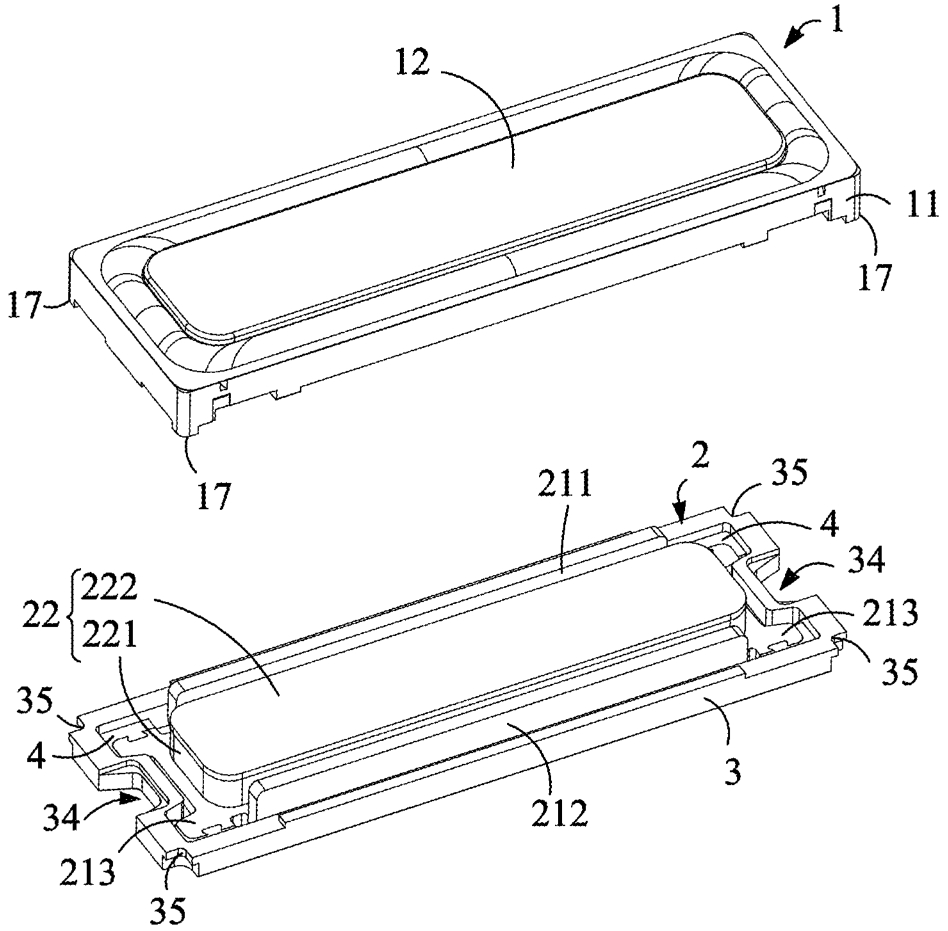
FIG. 2 is a first exploded view of the vibration damping loudspeaker according to the first embodiment of the disclosure.
Figure 3:
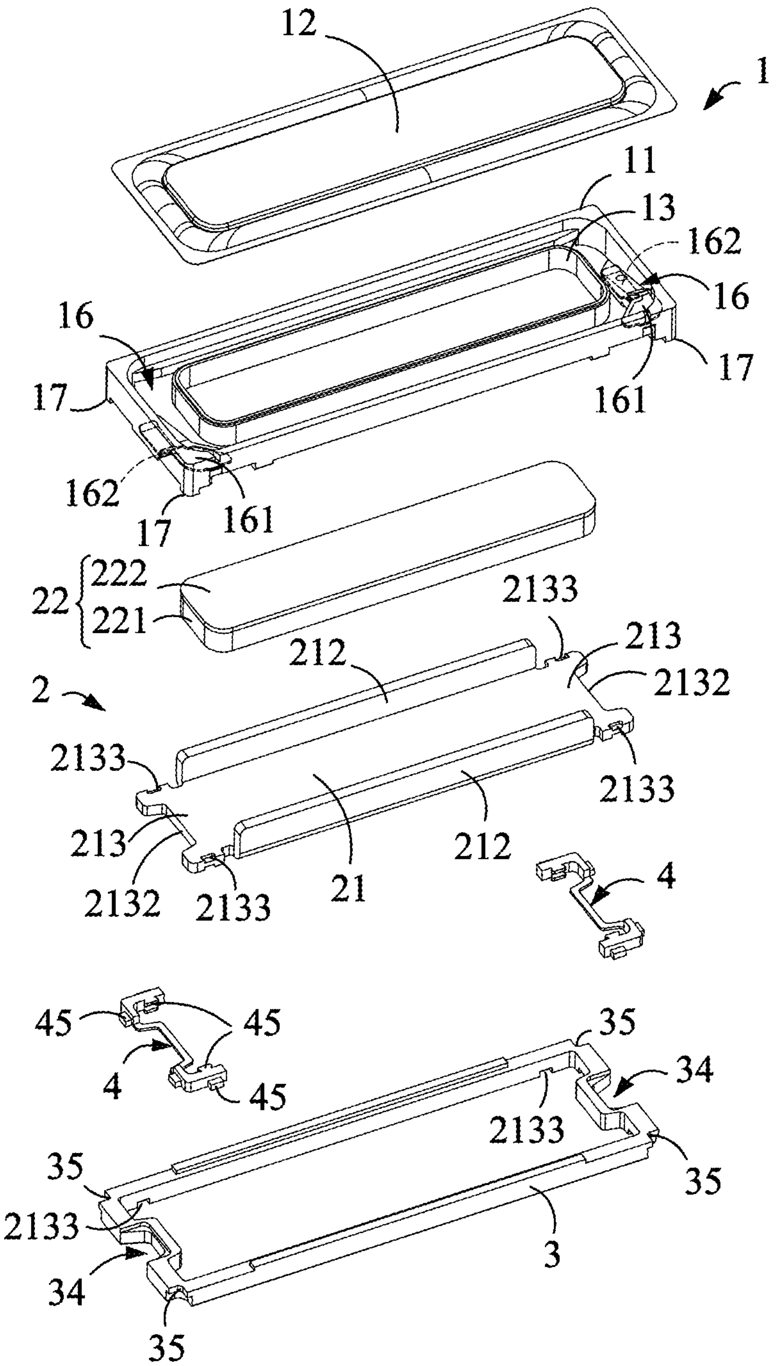
FIG. 3 is a second exploded view of the vibration damping loudspeaker according to the first embodiment of the disclosure.
Figure 4:
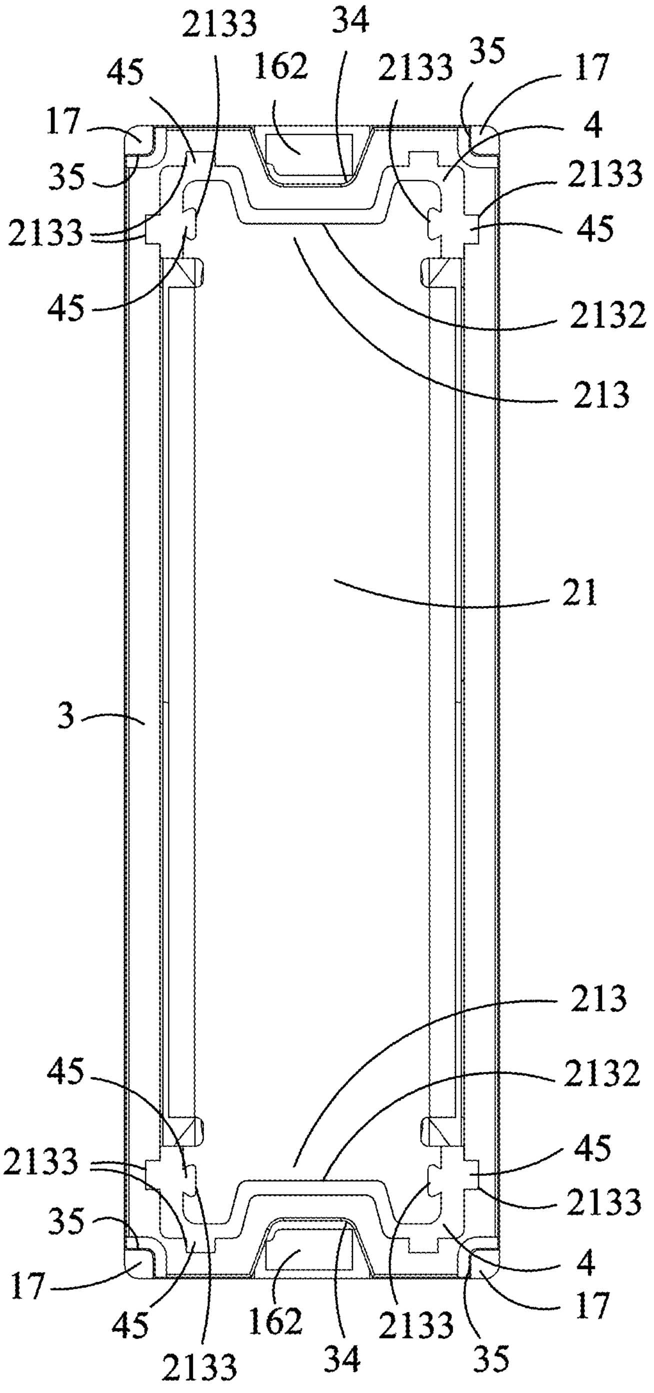
FIG. 4 is a schematic view of the bottom of the vibration damping loudspeaker according to the first embodiment of the disclosure.

To facilitate understanding of the object, characteristics and effects of the present disclosure, embodiments together with the attached drawings for the detailed description of the present disclosure are provided.

Referring to FIG. 1 through FIG. 4, the first embodiment of the disclosure provides a vibration damping loudspeaker comprising a sound-generating unit 1, a magnetic member 2, an assembly-auxiliary frame 3 and a plurality of dampers 4.

The sound-generating unit 1 comprises a speaker base 11, a diaphragm 12 and a voice coil 13. The speaker base 11 has a plurality of positioning units 17. The diaphragm 12 is disposed at the top of the speaker base 11. The voice coil 13 is connected to the bottom of the diaphragm 12.

The magnetic member 2 comprises a main magnetic plate 21 and a magnetic unit 22. The magnetic unit 22 is disposed on the top surface of the main magnetic plate 21. The voice coil 13 is movably disposed outside the magnetic unit 22. The magnetic unit 22 has a magnet 221 and a magnetic plate 222 which are stacked up.

The assembly-auxiliary frame 3 has a plurality of aligning units 35 and is disposed outside the magnetic member 2. The aligning units 35 are coupled to the positioning units 17 respectively to allow the assembly-auxiliary frame 3 to be mounted on the bottom of the speaker base 11. The assembly-auxiliary frame 3 and the speaker base 11 are coupled together by high-strength plastic elements to enhance assembly stability to preclude reliability issues, such as fall-induced failure. The aligning units 35 are coupled to the positioning units 17 by a rugged structure respectively.

The dampers 4 are symmetrically disposed between the main magnetic plate 21 and the assembly-auxiliary frame 3. In an embodiment of the disclosure, the dampers 4 are in the number of two (not restrictive of the disclosure), and the dampers 4 are made of rubber or silicone, with silicone hardness being 40 to 60 degrees, preferably 60 degrees. The dampers 4, the main magnetic plate 21 and the assembly-auxiliary frame 3 are integrally formed by injection molding.

The process of the assembling the vibration damping loudspeaker entails coupling the assembly-auxiliary frame 3 and the speaker base 11 together by the aligning units 35 and the positioning units 17 to preclude deviations of the sound-generating unit 1 and the magnetic member 2 relative to each other to allow the sound-generating unit 1 and the magnetic member 2 to be quickly and easily mounted in place to enhance the production yield. During its operation, the vibration damping loudspeaker can be coupled to an acoustic enclosure (not shown) to allow the voice coil 13 of the sound-generating unit 1 to receive external electronic signals such that the main magnetic plate 21 and the magnetic unit 22 of the magnetic member 2 coordinate with each other to provide more magnetic energy to allow the voice coil 13 to coordinate with the electromagnetic effect of the magnetic member 2 to drive the diaphragm 12 vibrating, increasing the sound volume of the vibration damping loudspeaker in operation.

During the operation of the vibration damping loudspeaker, owing to the assembly-auxiliary frame 3 and the dampers 4, the absence of direct contact between the speaker base 11 of the sound-generating unit 1 and the magnetic member 2 allows the dampers 4 to function as a buffer between the speaker base 11 and the magnetic member 2 to not only absorb (consume) the kinetic energy generated from the vibration of the speaker base 11 but also preclude the reverse transmission of the kinetic energy generated from the vibration of the magnetic member 2, so as to achieve vibration damping and vibration isolation during the operation of the vibration damping loudspeaker to spare users the discomfort they will otherwise experience for using electronic devices. With the dampers 4 functioning as a buffer between the speaker base 11 and the magnetic member 2, the magnetic member 2 and the speaker base 11 have similar vibration frequency but opposite phases, further enhancing vibration damping.

In addition to the aforesaid embodiments, an embodiment of the disclosure has technical features as follows: two long-side sides of the main magnetic plate 21 each have a longitudinal long-side magnetic plate 212; two short-side sides of the main magnetic plate 21 each have a transverse short-side magnetic plate 213; the assembly-auxiliary frame 3 is disposed outside the bottoms of the longitudinal long-side magnetic plates 212 and the transverse short-side magnetic plates 213; the dampers 4 are symmetrically disposed between each of the transverse short-side magnetic plates 213 and the corresponding one of the two short-side sides of the assembly-auxiliary frame 3; and the voice coil 13 is movably disposed between the longitudinal long-side magnetic plates 212 and the magnetic unit 22. The longitudinal long-side magnetic plates 212 are integrally formed with the main magnetic plate 21. The transverse short-side magnetic plates 213 are integrally formed with the main magnetic plate 21. Therefore, the vibration damping loudspeaker of the disclosure is advantageous in that the dampers 4 are symmetrically disposed on two short-side sides of the magnetic member 2 and adapted to function as a buffer between the speaker base 11 and the magnetic member 2 to not only absorb (consume) the kinetic energy generated from the vibration of the speaker base 11 but also preclude the reverse transmission of the kinetic energy generated from the vibration of the magnetic member 2, so as to achieve vibration damping and vibration isolation during the operation of the vibration damping loudspeaker to spare users the discomfort they will otherwise experience for using electronic devices.

In addition to the aforesaid embodiments, an embodiment has technical features as follows: the dampers 4 each have a plurality of first fitting portions 45, the assembly-auxiliary frame 3, and the transverse short-side magnetic plates 213 each having at least a second fitting portion 2133; the first fitting portions 45 of the dampers 4 are fitted to the assembly-auxiliary frame 3 and the second fitting portions 2133 of the transverse short-side magnetic plates 213 respectively to couple together the magnetic member 2, the assembly-auxiliary frame 3 and the dampers 4 such that the first fitting portions 45 coordinate with the second fitting portions 2133 to effectively increase the strength of coupling the dampers 4 to the magnetic member 2 and the assembly-auxiliary frame 3 and prevent the separation of the dampers 4 from the magnetic member 2 and the assembly-auxiliary frame 3. The first fitting portions 45 are coupled to the second fitting portions 2133 by rugged structures respectively.

In addition to the aforesaid embodiments, an embodiment has technical features as follows: the assembly-auxiliary frame 3, the dampers 4, and the transverse short-side magnetic plates 213 of the main magnetic plate 21 are integrally formed by injection molding. Upon completion of the injection molding, the dampers 4 form a plurality of first fitting portions 45 which can enter the second fitting portions 2133 respectively to allow the first fitting portions 45 to be fitted to the assembly-auxiliary frame 3 and the second fitting portions 2133 of the transverse short-side magnetic plates 213. Thus, it is not necessary to apply an adhesive to between the magnetic member 2, the assembly-auxiliary frame 3, and the dampers 4 in order to finish mounting the dampers 4 in place to quickly and easily mount the dampers 4 in place, enhancing the production yield.

In addition to the aforesaid embodiments, an embodiment has technical features as follows: two short-side sides of the speaker base 11 each have an electrically conductive sheet 16; the electrically conductive sheets 16 each have a first electrode 161 and a second electrode 162; the first electrodes 161 are each disposed at the top of the speaker base 11; the second electrodes 162 are each disposed at the bottom of the speaker base 11; two short-side sides of the assembly-auxiliary frame 3 each have a first dent 34; the transverse short-side magnetic plates 213 each have a second dent 2132; the second electrodes 162 are disposed in the first dents 34 respectively, the first dents 34 are disposed at the second dents 2132 respectively; and the voice coil 13 is electrically connected to the first electrodes 161. When the vibration damping loudspeaker is coupled to an acoustic enclosure (not shown), external electronic signal lines (not shown) are electrically connected to the second electrodes 162 respectively to allow the voice coil 13 of the sound-generating unit 1 to receive external electronic signals such that the main magnetic plate 21 and the magnetic unit 22 of the magnetic member 2 coordinate with each other to provide more magnetic energy to allow the voice coil 13 to coordinate with the electromagnetic effect of the magnetic member 2 to drive the diaphragm 12 vibrating, increasing the sound volume of the vibration damping loudspeaker in operation. With the dampers 4 being positioned at four corners between the assembly-auxiliary frame 3 and the magnetic member 2 respectively, a magnetic gap 211 of the magnetic member 2 and the voice coil 13 of the sound-generating unit 1 align with each other accurately in the directions of X-axis, Y-axis and Z-axis when the assembly-auxiliary frame 3, the magnetic member 2 and the sound-generating unit 1 are mounted in place, enhancing the yield of the magnetic member 2 and the sound-generating unit 1 mounted in place.

Figure 5:
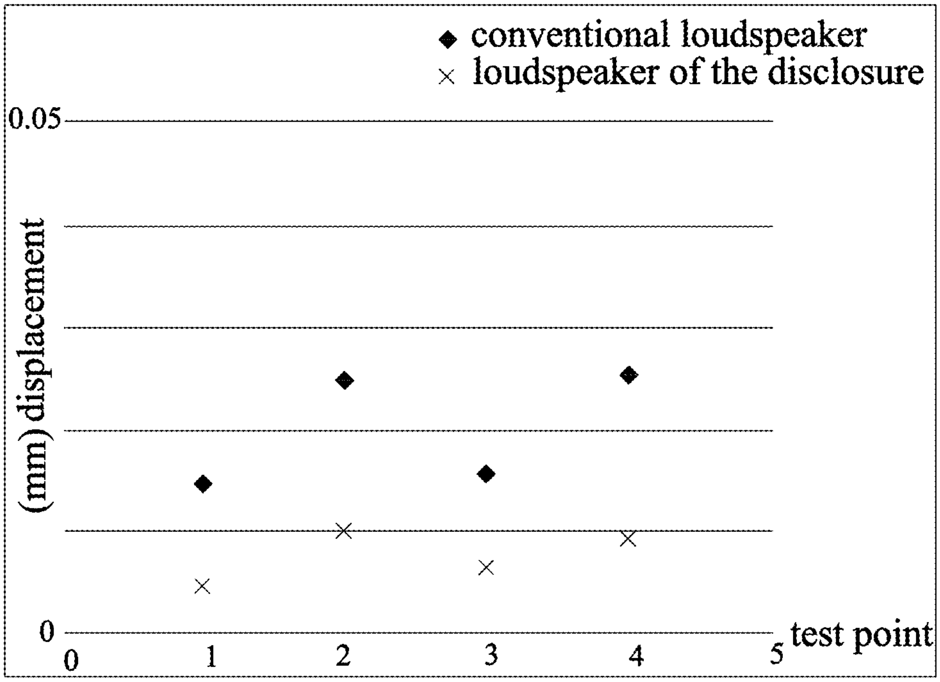
FIG. 5 is a schematic view of testing the vibration damping loudspeaker of the disclosure and a conventional loudspeaker.

Referring to FIG. 5, two short-side sides (test point 1 and test point 3) and two long-side sides (test point 2 and test point 4) of the vibration damping loudspeaker of the disclosure each have a vibration sensing component. Likewise, two short-side sides (test point 1 and test point 3) and two long-side sides (test point 2 and test point 4) of a conventional loudspeaker each have a vibration sensing component. As shown in FIG. 5, the test shows that the vibration damping loudspeaker of the disclosure surpasses the conventional loudspeaker in vibration damping.

Referring to FIG. 6 through FIG. 13, the second embodiment of the disclosure provides another vibration damping loudspeaker comprising a sound-generating unit 1, a magnetic member 2, an assembly-auxiliary frame 3 and a plurality of dampers 4. The sound-generating unit 1 comprises a speaker base 11, a diaphragm 12, a voice coil 13 and at least a spider 14. The speaker base 11 is cuboid (or cubic) and has a plurality of positioning units 111. The positioning units 111 are convex structures, slot structures or engaging structures. The diaphragm 12 is cuboid (or cubic) and is disposed at the top of the speaker base 11. The voice coil 13 is cuboid (or cubic) and is connected to the bottom of the diaphragm 12. The spider 14 is in the number of two and are symmetrically disposed between each of short-side sides 112 of the speaker base 11 and a corresponding one of short-side sides 131 of the voice coil 13 (alternatively, the spiders 14 are integrally disposed between the speaker base 11 and the voice coil 13). The spiders 14 are each integrally formed and each have a first connection side 141, a second connection side 142, at least a connection segment 143 and at least a ventilation unit 144. The connection segment 143 is U-shaped and is connected between the first connection side 141 and the second connection side 142. The ventilation unit 144 is a penetrating hole and is disposed between the first connection side 141, the second connection side 142 and the connection segment 143. The first connection side 141 is connected to the bottoms of short-side sides 112 of the speaker base 11. The second connection side 142 is connected to the bottoms of short-side sides 131 of the voice coil 13. The magnetic member 2 is cuboid (or cubic) and comprises a main magnetic plate 21 and a magnetic unit 22. The magnetic unit 22 comprises a magnet 221 and a magnetic plate 222 which are stacked up. The magnet 221 is disposed at the top of the main magnetic plate 21. The voice coil 13 is movably disposed in the magnetic gap 211 outside the magnetic unit 22. The assembly-auxiliary frame 3 is cuboid (or cubic) and has a plurality of aligning units 321. The aligning units 321 are complementary structures that complement the positioning units 111 respectively, and the complementary structures are slot structures, convex structures or engaging structures. The aligning units 321 are coupled to the positioning units 111 respectively to allow the assembly-auxiliary frame 3 to be mounted on the speaker base 11. The dampers 4 are in a number not restrictive of the disclosure and are symmetrically disposed between each of the long-side sides of the main magnetic plate 21 and a corresponding one of long-side sides 31 of the assembly-auxiliary frame 3 (Alternatively, the dampers 4 are symmetrically disposed between each of the two short-side sides of the main magnetic plate 21 and a corresponding one of two short-side sides 32 of the assembly-auxiliary frame 3.)

Figure 6:
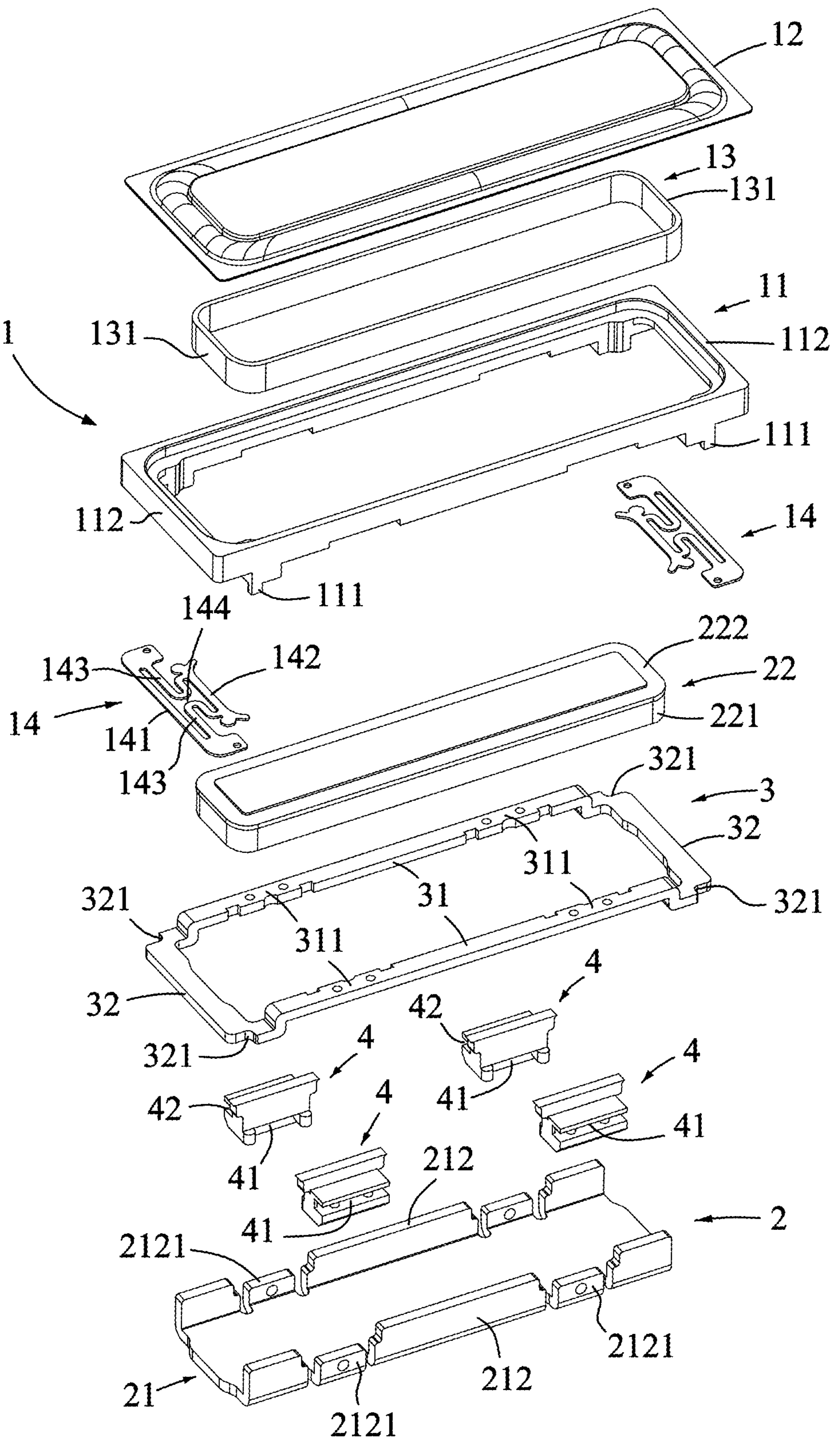
FIG. 6 is a first exploded view of the vibration damping loudspeaker according to the second embodiment of the disclosure.

Thus, regarding the assembly process of the vibration damping loudspeaker of the disclosure, the aligning units 321 of the assembly-auxiliary frame 3 are coupled to the positioning units 111 of the speaker base 11 respectively to preclude deviations of the sound-generating unit 1 and the magnetic member 2 relative to each other to allow the sound-generating unit 1 and the magnetic member 2 to be quickly and easily mounted in place to enhance the production yield. An appropriate adhesive is coated onto an attachment surface of the assembly-auxiliary frame 3 (or the top surfaces of the dampers 4) to allow the assembly-auxiliary frame 3 to be fixed to the speaker base 11. Therefore, not only is the voice coil 13 precisely positioned in the magnetic gap 211 of the magnetic member 2, but it is also impossible for the magnetic member 2 to hit the voice coil 13 to damage the voice coil 13 during the assembly process. The vibration damping loudspeaker in operation can be coupled to an acoustic enclosure (not shown) such that the voice coil 13 of the sound-generating unit 1 receives external electronic signals; then, the main magnetic plate 21 and the magnetic unit 22 of the magnetic member 2 coordinate with each other to provide more magnetic energy to allow the voice coil 13 to coordinate with the electromagnetic effect of the magnetic member 2 to drive the diaphragm 12 vibrating, increasing the sound volume of the vibration damping loudspeaker in operation. The spiders 14 of the vibration damping loudspeaker of the disclosure each have a ventilation unit 144 and are flat as shown in FIG. 6 or of any other shape (for example, wavy shape) to allow the vibration damping loudspeaker of the disclosure to discharge a gas to the outside to increase the rated power (for example, 2W or above). When the vibration damping loudspeaker of the disclosure is subjected to a high power, the voice coil 13 and the diaphragm 12 undergo vibration characterized by a large axial displacement. The spiders 14 enable the voice coil 13 and the diaphragm 12 to undergo axial movement without deviations, preventing the voice coil 13 and the diaphragm 12 from colliding with the other components of the vibration damping loudspeaker of the disclosure to end up in distortion or damage.

When the vibration damping loudspeaker of the disclosure is operating, the assembly-auxiliary frame 3 and the dampers 4 together preclude direct contact between the speaker base 11 of the sound-generating unit 1 and the magnetic member 2, and the dampers 4 function as a buffer between the speaker base 11 and the magnetic member 2 to not only absorb (consume) the kinetic energy generated from the vibration of the speaker base 11 but also preclude the reverse transmission of the kinetic energy generated from the vibration of the magnetic member 2, so as to achieve vibration damping and vibration isolation during the operation of the vibration damping loudspeaker to spare users the discomfort they will otherwise experience for using electronic devices. With the dampers 4 functioning as a buffer between the speaker base 11 and the magnetic member 2, the magnetic member 2 and the speaker base 11 have similar vibration frequency but opposite phases, further enhancing vibration damping.

Figure 12:
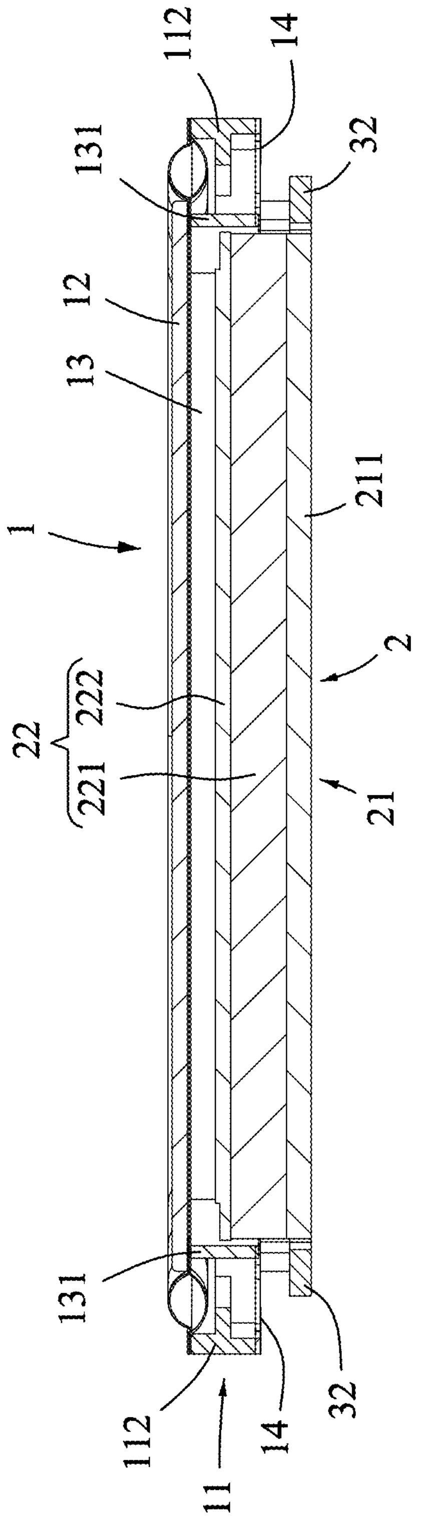
FIG. 12 is a cross-sectional view of a long-side side of the vibration damping loudspeaker according to the second embodiment of the disclosure.
Figure 13:
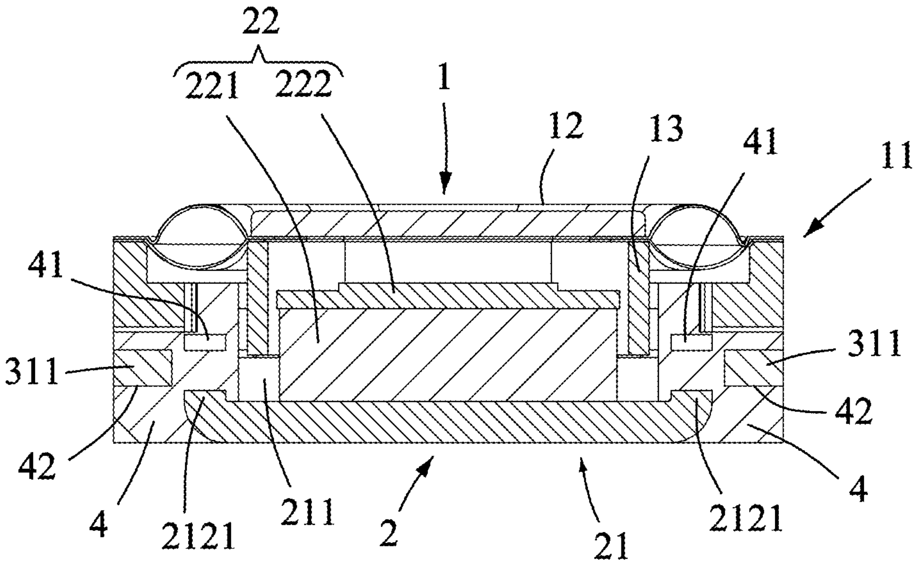
FIG. 13 is a cross-sectional view of a short-side side of the vibration damping loudspeaker according to the second embodiment of the disclosure.

As shown in FIG. 6 through FIG. 13, in an embodiment, the spiders 14 of the vibration damping loudspeaker are each disposed between each of two short-side sides 112 of the speaker base 11 and a corresponding one of two short-side sides 131 of the voice coil 13 and are symmetrically arranged. The main magnetic plate 21 has two longitudinal long-side magnetic plates 212. The longitudinal long-side magnetic plates 212 are integrally formed with the main magnetic plate 21. The voice coil 13 is movably disposed in the magnetic gap 211 between each of the longitudinal long-side magnetic plates 212 and the magnetic unit 22. The dampers 4 are each disposed between each of the longitudinal long-side magnetic plates 212 of the main magnetic plate 21 and a corresponding one of the two long-side sides 31 of the assembly-auxiliary frame 3. The assembly-auxiliary frame 3 has two downward-concave short-side sides 32 so as to be connected between the long-side sides 31 of the assembly-auxiliary frame 3. The assembly-auxiliary frame 3 is integrally formed. Two ends of each of the downward-concave short-side sides 32 of the assembly-auxiliary frame 3 are connected to a corresponding one of the long-side sides 31 of the assembly-auxiliary frame 3 by an S-shaped connection segment, allowing the downward-concave short-side sides 32 and the main magnetic plate 21 to lie at the same horizontal position (as shown in FIG. 12) or substantially the same horizontal position. Therefore, notches are formed between the short-side sides 112 of the speaker base 11 and the downward-concave short-side sides 32 to provide sufficient space required for discharging a gas from the inside of the vibration damping loudspeaker when the vibration damping loudspeaker is subjected to a high power. The notches provide reserved space dedicated to the vibration of the spiders 14 to allow the spiders 14 to perform a damping function.

Figure 7:
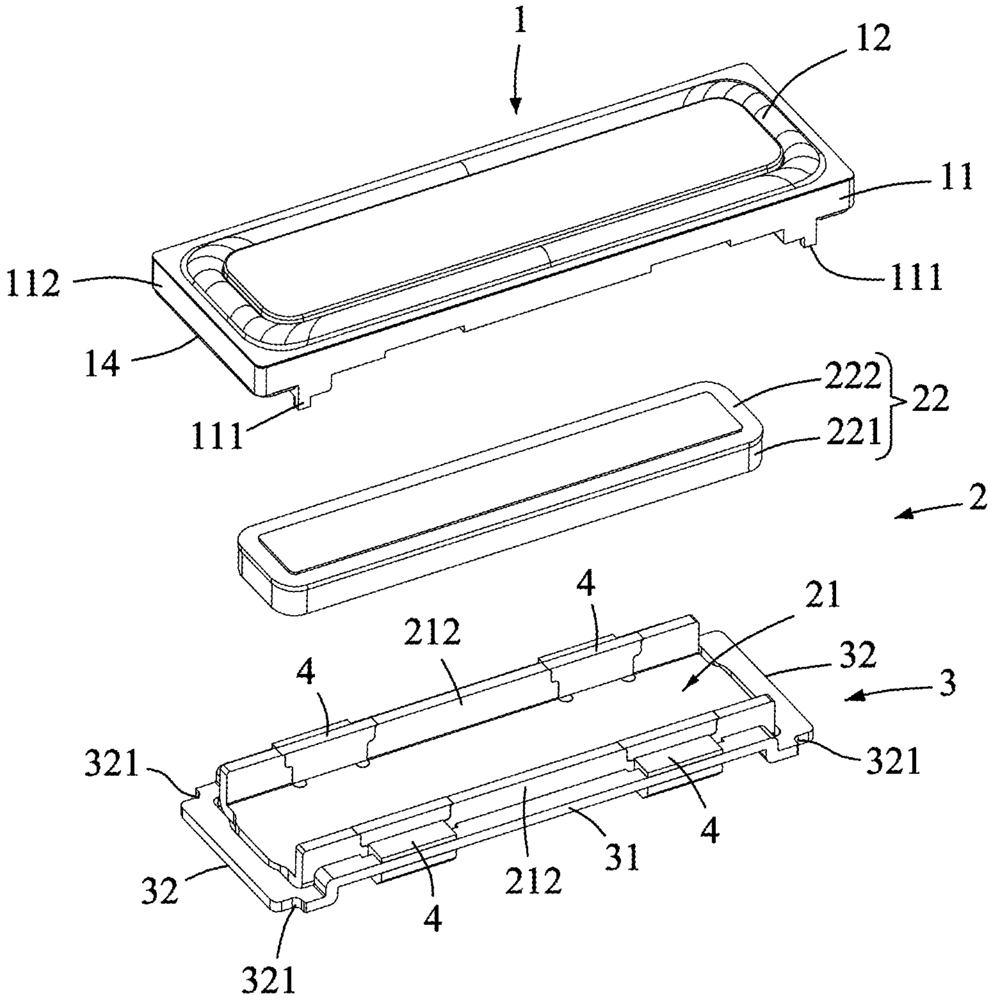
FIG. 7 is a second exploded view of the vibration damping loudspeaker according to the second embodiment of the disclosure.
Figure 8:
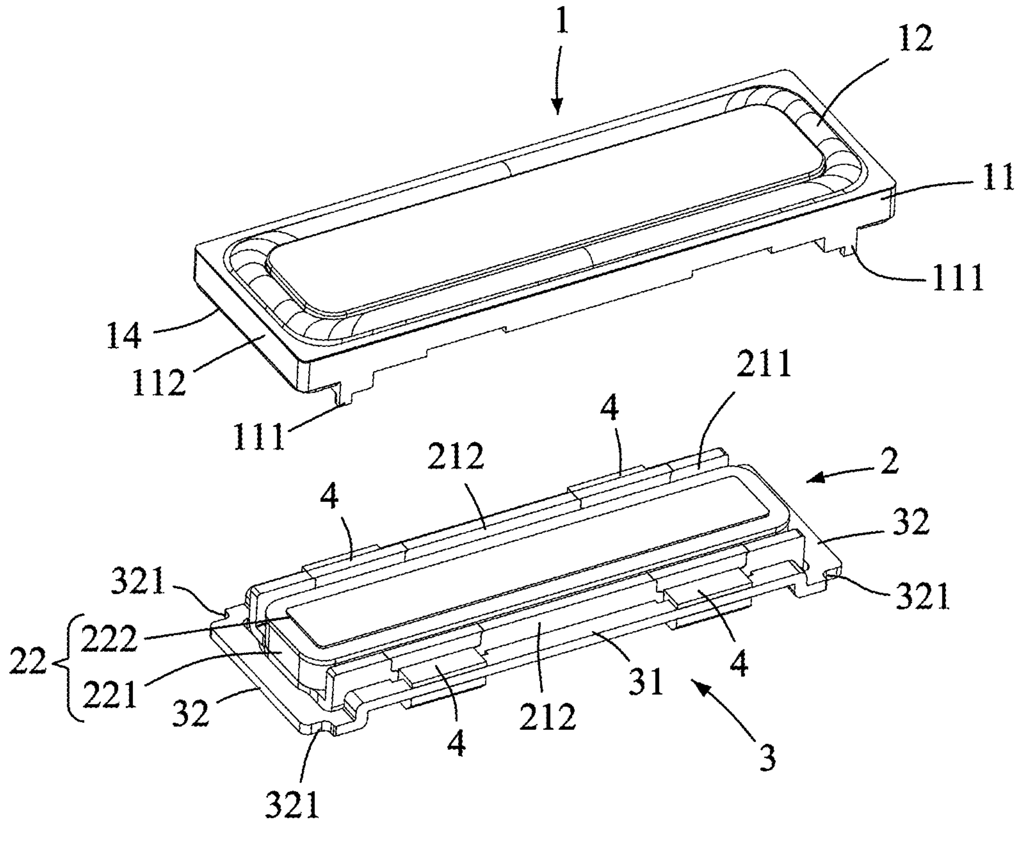
FIG. 8 is a third exploded view of the vibration damping loudspeaker according to the second embodiment of the disclosure.
Figure 9:
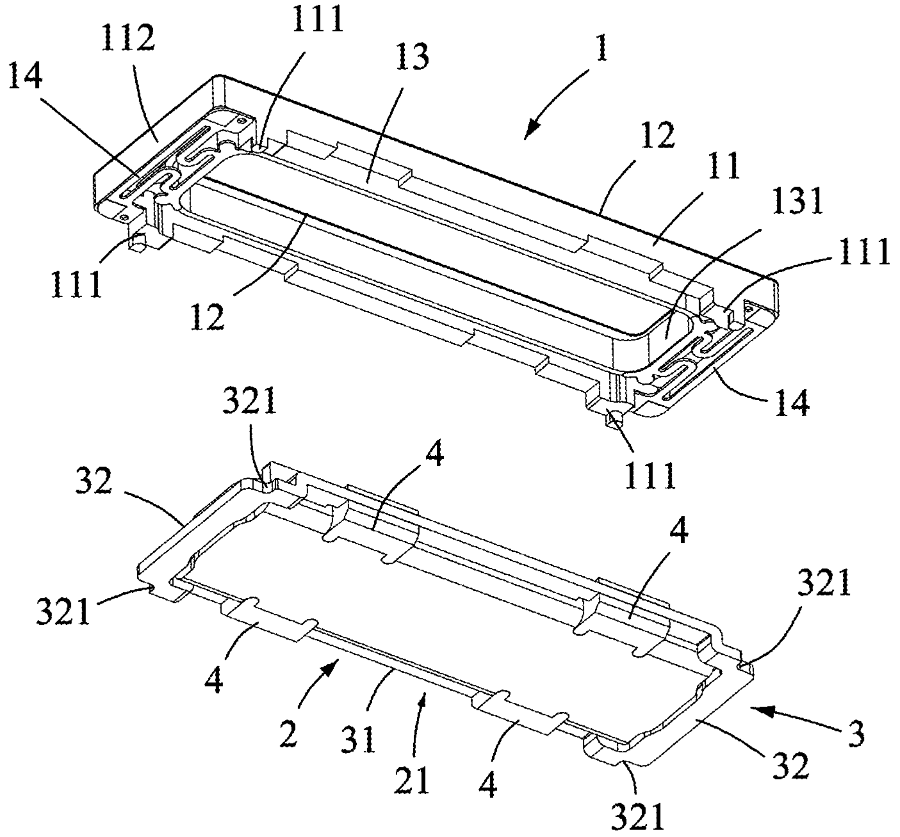
FIG. 9 is a fourth exploded view of the vibration damping loudspeaker according to the second embodiment of the disclosure.
Figure 10:
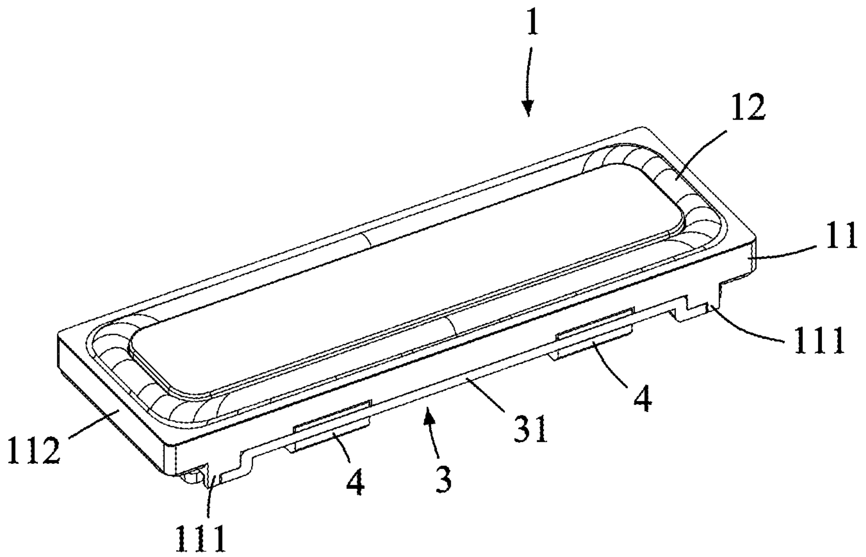
FIG. 10 is a first perspective view of the vibration damping loudspeaker according to the second embodiment of the disclosure.
Figure 11:
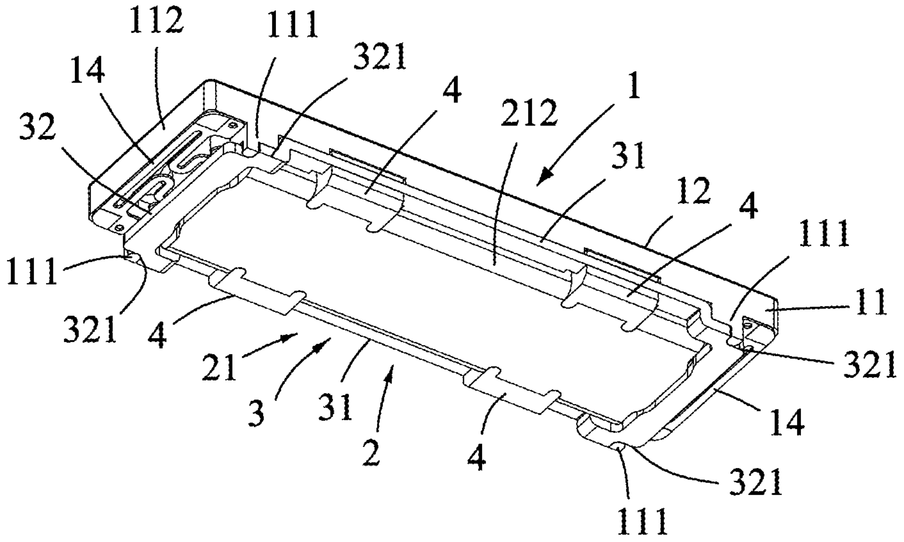
FIG. 11 is a second perspective view of the vibration damping loudspeaker according to the second embodiment of the disclosure.

As shown in FIG. 6 and FIG. 7, an embodiment of the disclosure has technical features as follows: the dampers 4 of the vibration damping loudspeaker each have a first fitting unit 41 (for example, a fitting slot with a fitting cylinder) and a second fitting unit 42 (for example, a fitting slot with a fitting cylinder); the longitudinal long-side magnetic plates 212 of the main magnetic plate 21 each have at least a third fitting unit 2121 (for example, an L-shaped fitting plate with a fitting hole); the long-side sides 31 of the assembly-auxiliary frame 3 each have at least a fourth fitting unit 311 (for example, a transverse fitting plate with a fitting hole), with the first fitting unit 41 fitted to the third fitting unit 2121, and the second fitting unit 42 fitted to the fourth fitting unit 311. Therefore, according to the disclosure, the longitudinal long-side magnetic plates 212 of the main magnetic plate 21, the dampers 4, and the long-side sides 31 of the assembly-auxiliary frame 3 are fitted to each other by means of fitting.

As shown in FIG. 6 and FIG. 7, in an embodiment, the longitudinal long-side magnetic plates 212 of the main magnetic plate 21, the dampers 4, and the long-side sides 31 of the assembly-auxiliary frame 3 of the vibration damping loudspeaker are integrally formed by injection molding to further augment the strength of coupling together the longitudinal long-side magnetic plates 212 of the main magnetic plate 21, the dampers 4, and the long-side sides 31 of the assembly-auxiliary frame 3. For example, the dampers 4 are each coupled to between a corresponding one of the longitudinal long-side magnetic plates 212 of the main magnetic plate 21 and a corresponding one of the long-side sides 31 of the assembly-auxiliary frame 3 by injection molding. Therefore, it is not necessary to apply an adhesive to between the magnetic member 2, the assembly-auxiliary frame 3, and the dampers 4 in order to finish mounting the dampers 4 in place to quickly and easily mount the dampers 4 in place, enhancing the production yield.

Referring to FIG. 15 through FIG. 20, the third embodiment of the disclosure provides yet another vibration damping loudspeaker with distinguishing technical features described below. The spiders 14 are each disposed between one of the two short-side sides 112 of the speaker base 11 and a corresponding one of the two short-side sides 131 of the voice coil 13 and are symmetrically arranged. The main magnetic plate 21 has two longitudinal long-side magnetic plates 212 and two transverse short-side magnetic plates 213. The longitudinal long-side magnetic plates 212 and the transverse short-side magnetic plates 213 are integrally formed with the main magnetic plate 21. The voice coil 13 is movably disposed in the magnetic gap 211 between the longitudinal long-side magnetic plates 212 and the magnetic unit 22. The thickness of the transverse short-side magnetic plates 213 is less than the thickness of the main magnetic plate 21. The assembly-auxiliary frame 3 has two upward-convex short-side sides 33 so as to be connected between the two long-side sides 31 of the assembly-auxiliary frame 3. The assembly-auxiliary frame 3 is integrally formed. Two ends of each of the upward-convex short-side sides 33 of the assembly-auxiliary frame 3 are connected to a corresponding one of the long-side sides 31 of the assembly-auxiliary frame 3 by an S-shaped connection segment, allowing each of the dampers 4 to be disposed between a corresponding one of the transverse short-side magnetic plates 213 of the main magnetic plate 21 and a corresponding one of the upward-convex short-side sides 33 of the assembly-auxiliary frame 3. Therefore, notches are formed between the short-side sides 112 of the speaker base 11 and the upward-convex short-side sides 33 to provide sufficient space required for discharging a gas from the inside of the vibration damping loudspeaker when the vibration damping loudspeaker is subjected to a high power. The notches provide reserved space dedicated to the vibration of the spiders 14 to allow the spiders 14 to perform a damping function. The vibration damping loudspeaker of the disclosure incurs minimal processing cost because of the structural simplicity and integrity of the main magnetic plate 21 and the longitudinal long-side magnetic plates 212; for example, since there are no breaks in the main magnetic plate 21 and the longitudinal long-side magnetic plates 212, it is feasible to maintain magnetic permeation efficiency, increase the sound volume of the loudspeaker, reduce the distortion of the loudspeaker, allow the assembly-auxiliary frame 3 to dispense with any related structure thereof, and thus augment the mechanical strength of the assembly-auxiliary frame 3. Owing to the structural simplicity and integrity of the assembly-auxiliary frame 3, it is feasible for the long-side sides 31 of the assembly-auxiliary frame 3 and the long-side sides of the speaker base 11 to have more adhesive surfaces for augmenting the stability of the assembly-auxiliary frame 3 and the speaker base 11 mounted in place. The dampers 4 enclose the transverse short-side magnetic plates 213 of the main magnetic plate 21 to absorb (consume) the kinetic energy generated from the vibration of the main magnetic plate 21 and the assembly-auxiliary frame 3 in the horizontal and vertical directions.

Figure 15:
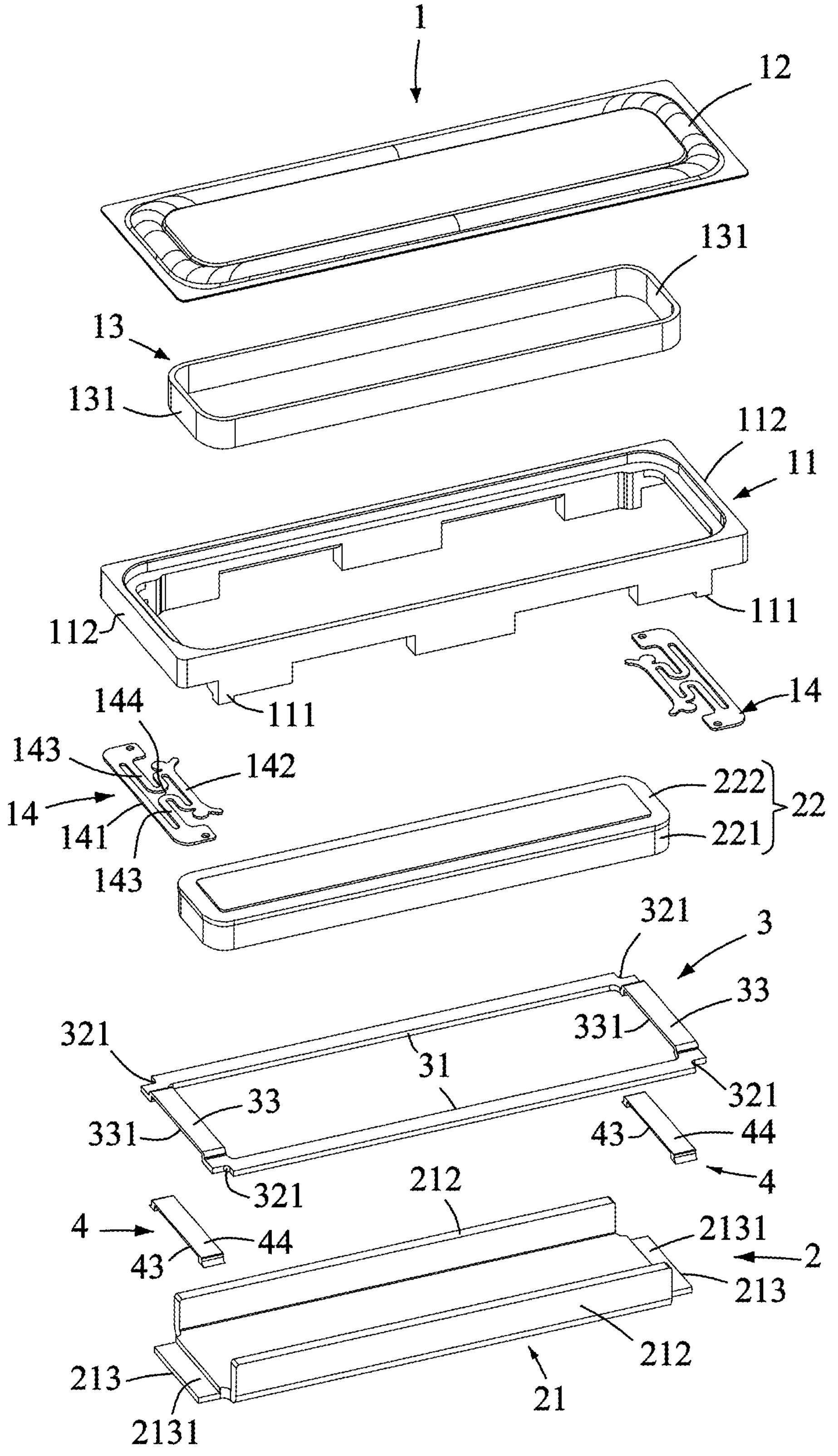
FIG. 15 is a first exploded view of the vibration damping loudspeaker according to the third embodiment of the disclosure.
Figure 16:
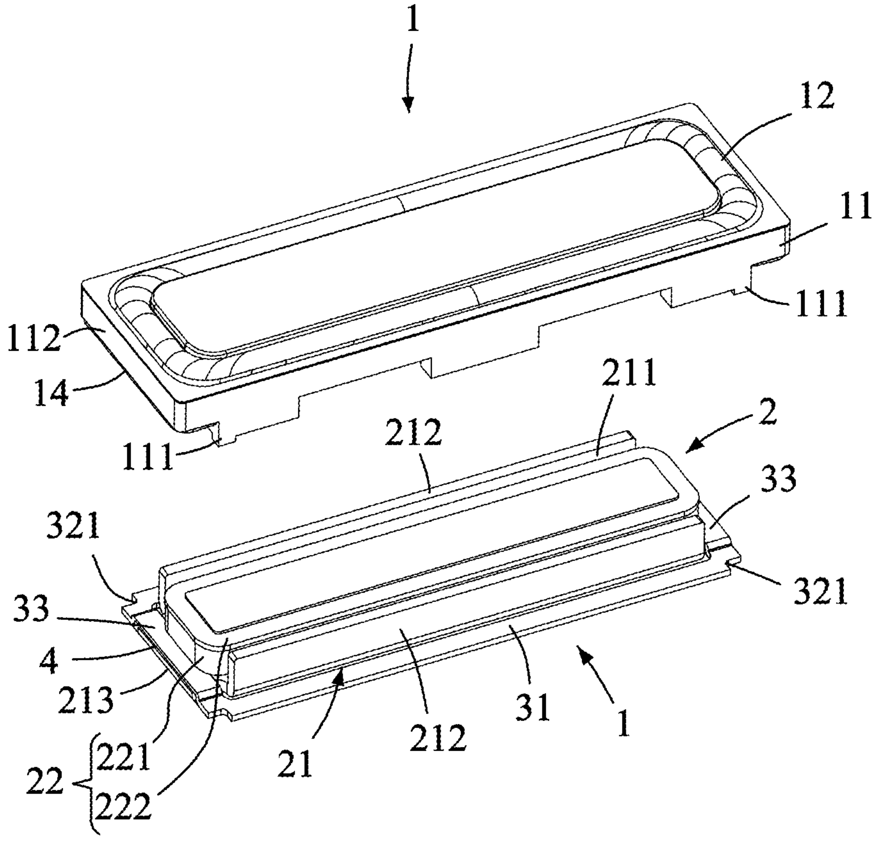
FIG. 16 is a second exploded view of the vibration damping loudspeaker according to the third embodiment of the disclosure.
Figure 17:
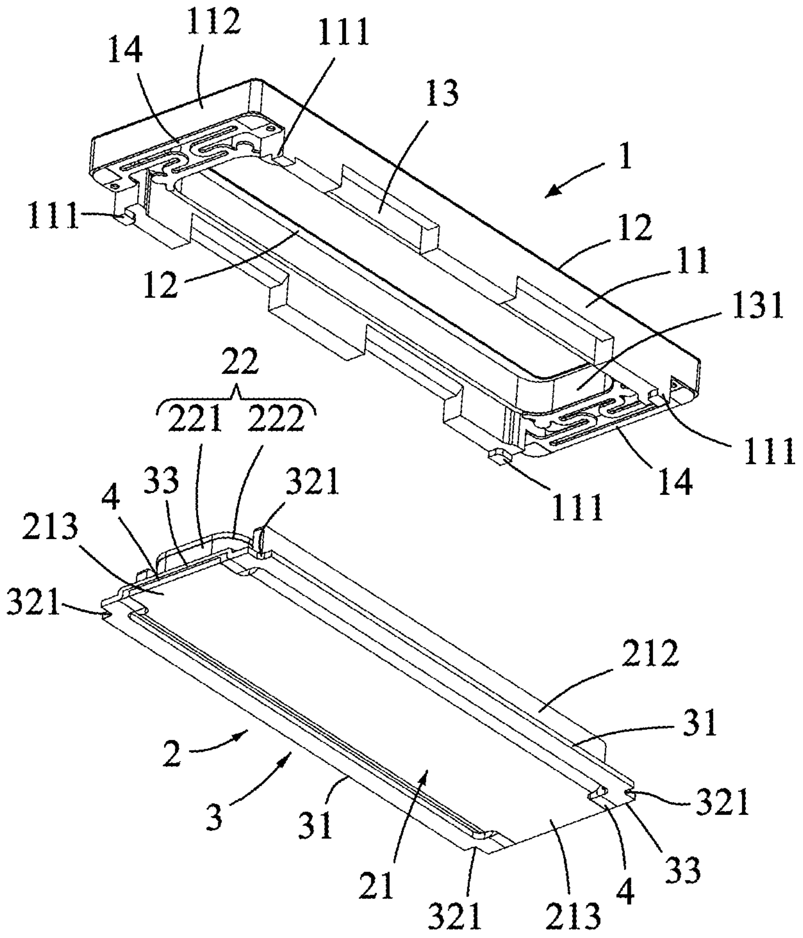
FIG. 17 is a third exploded view of the vibration damping loudspeaker according to the third embodiment of the disclosure.
Figure 18:
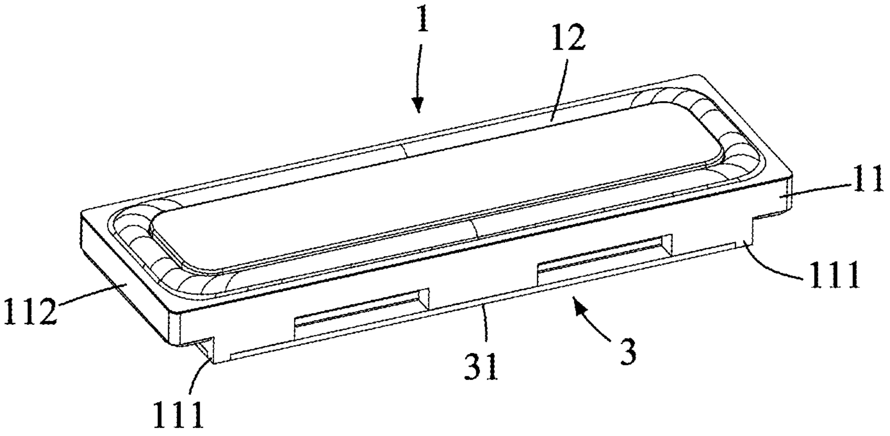
FIG. 18 is a first perspective view of the vibration damping loudspeaker according to the third embodiment of the disclosure.
Figure 19:
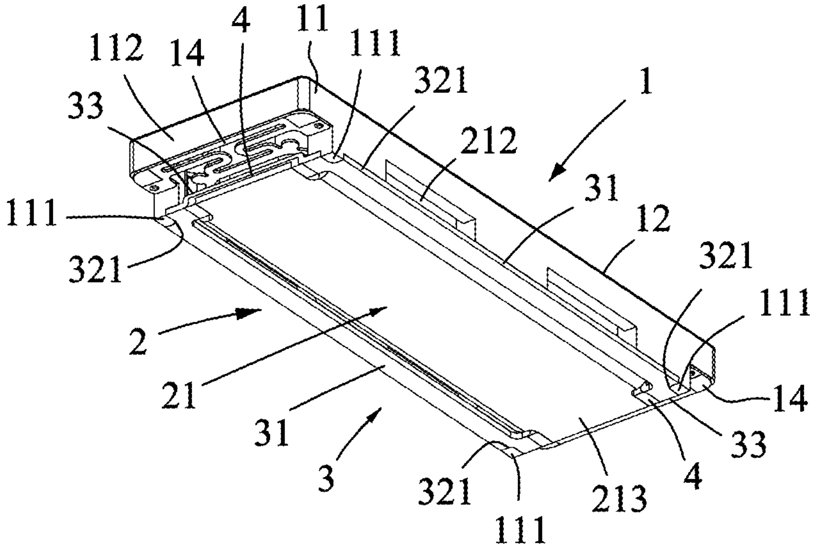
FIG. 19 is a second perspective view of the vibration damping loudspeaker according to the third embodiment of the disclosure.
Figure 20:
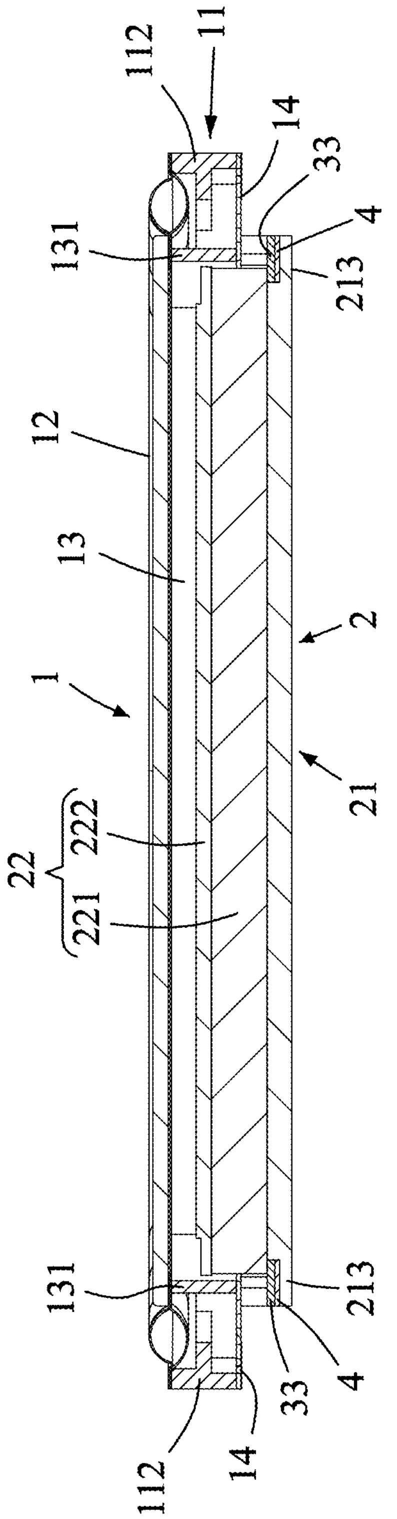
FIG. 20 is a cross-sectional view of a long-side side of the vibration damping loudspeaker according to the third embodiment of the disclosure.

As shown in FIG. 15 and FIG. 16, an embodiment of the disclosure has distinguishing technical features described below. The dampers 4 of the vibration damping loudspeaker each have a fifth fitting unit 43 (for example, U-shaped fitting slot) and a sixth fitting unit 44 (for example, U-shaped fitting convex). The transverse short-side magnetic plates 213 of the main magnetic plate 21 each have a seventh fitting unit 2131, and the seventh fitting unit 2131 is a fitting slot formed as a result of the difference in thickness between the transverse short-side magnetic plate 213 and the main magnetic plate 21. The upward-convex short-side sides 33 of the assembly-auxiliary frame 3 each have an eighth fitting unit 331 (for example, U-shaped fitting slot), with the fifth fitting unit 43 fitted to the seventh fitting unit 2131, and the sixth fitting unit 44 fitted to the eighth fitting unit 331. Therefore, the transverse short-side magnetic plates 213 of the main magnetic plate 21, the dampers 4, and the upward-convex short-side sides 33 of the assembly-auxiliary frame 3 are fitted to each other by means of fitting.

As shown in FIG. 15 and FIG. 16, in an embodiment of the disclosure, the vibration damping loudspeaker has distinguishing technical features described below. The transverse short-side magnetic plates 213 of the main magnetic plate 21, the dampers 4, and the upward-convex short-side sides 33 of the assembly-auxiliary frame 3 are integrally formed by injection molding to further augment the strength of coupling together the transverse short-side magnetic plates 213 of the main magnetic plate 21, the dampers 4, and the upward-convex short-side sides 33 of the assembly-auxiliary frame 3. For example, the dampers 4 are coupled to between the transverse short-side magnetic plates 213 of the main magnetic plate 21 and the upward-convex short-side sides 33 of the assembly-auxiliary frame 3 by injection molding. Therefore, it is not necessary to apply an adhesive to between the magnetic member 2, the dampers 4, and the assembly-auxiliary frame 3 in order to finish mounting the dampers 4 in place to quickly and easily mount the dampers 4 in place, enhancing the production yield.

As shown in FIG. 15 through FIG. 20, in an embodiment of the disclosure, the vibration damping loudspeaker has distinguishing technical features described below. The dampers 4 are made of silicone, rubber or foam and mounted in place by any appropriate means, including injection molding. For example, the dampers 4 are formed from film made of foam or rubber and then directly adhered to adhesion positions between the assembly-auxiliary frame 3 and the main magnetic plate 21. Alternatively, soft plastic elements are injected onto regions defined at the adhesion positions between the assembly-auxiliary frame 3 and the main magnetic plate 21, allowing the assembly-auxiliary frame 3 and the main magnetic plate 21 to be coupled together. Since the assembly-auxiliary frame 3 need not have any reserved structure required for being coupled to the dampers 4 by injection molding, the assembly-auxiliary frame 3 exhibits structural integrity and high mechanical strength conducive to suppression of vibration of the vibration damping loudspeaker of the disclosure. The assembly-auxiliary frame 3 is made of plastic or metal. For instance, the assembly-auxiliary frame 3 is made of stainless steel or cold rolled steel sheet to augment the mechanical strength of the assembly-auxiliary frame 3. The augmented mechanical strength of the assembly-auxiliary frame 3 is conducive to both the deformation resistance and the vibration suppression capability of the vibration damping loudspeaker of the disclosure.

In the second embodiment (or third embodiment) of the disclosure, the vibration damping loudspeaker has distinguishing technical features described below. The dampers 4 are made of silicone, rubber or foam. When made of silicone, the dampers 4 have hardness of 40 to 60 degrees, preferably 60 degrees. The assembly-auxiliary frame 3 and the speaker base 11 are made of the same material or different materials. For example, the speaker base 11 is made of plastic, and the assembly-auxiliary frame 3 is made of metal. Preferably, the rigidity of the assembly-auxiliary frame 3 is greater than the rigidity of the speaker base 11, and thus the assembly-auxiliary frame 3 surpasses the speaker base 11 in mechanical strength.

Figure 14:
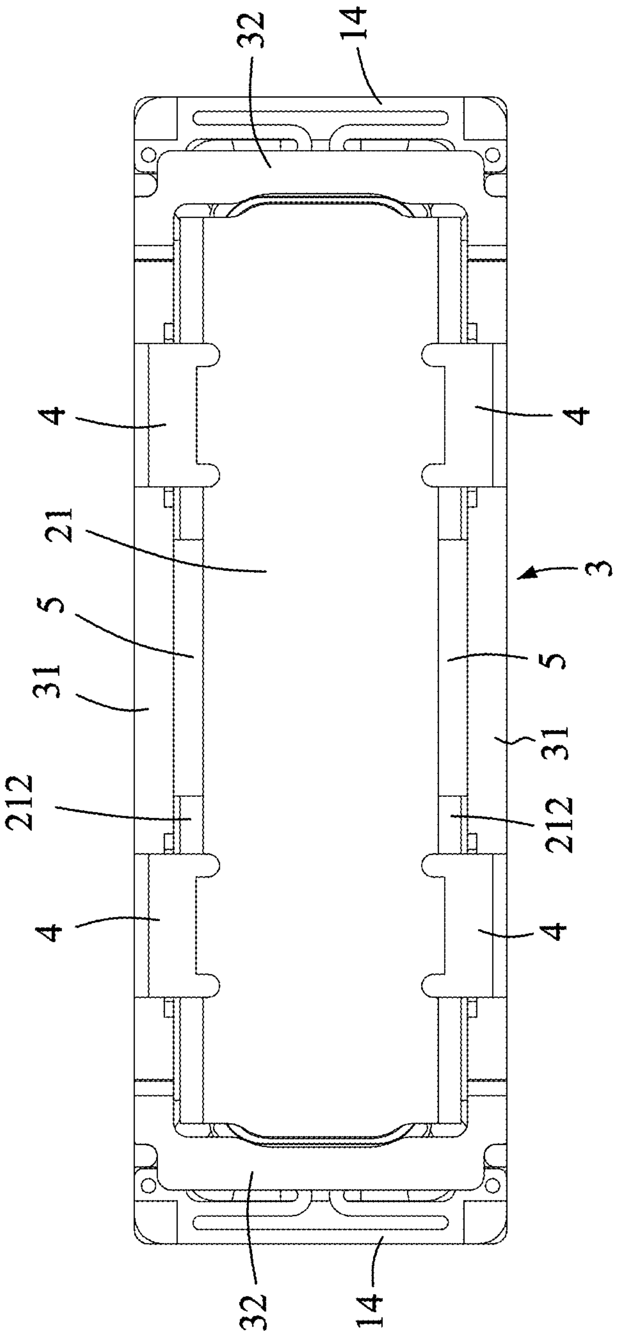
FIG. 14 is a schematic view of the vibration damping loudspeaker according to the second embodiment of the disclosure, showing that soft plastic elements are disposed at the bottom of the vibration damping loudspeaker.

As shown in FIG. 14, in the second embodiment (or third embodiment) of the disclosure, the vibration damping loudspeaker has distinguishing technical features described below. A plurality of soft plastic elements 5 symmetrically arranged are disposed between the two long-side sides 31 of the assembly-auxiliary frame 3 and the two longitudinal long-side magnetic plates 212 of the main magnetic plate 21. Therefore, the vibration damping loudspeaker of the disclosure is advantageous in that the dampers 4 coordinate with the soft plastic elements 5 to enhance vibration damping. The soft plastic elements 5 are made of UV-cured plastic. Owing to the low adhesion strength UV-cured plastic, the soft plastic elements 5 still exhibit hardness to a certain extent even after being cured. Therefore, UV-cured plastic is an appropriate vibration damping material.

While the present disclosure has been described by means of specific embodiments, numerous modifications and variations could be made thereto by those skilled in the art without departing from the scope and spirit of the present disclosure set forth in the claims.

What is claimed is:

1. A vibration damping loudspeaker, comprising:

a sound-generating unit comprising a speaker base, a diaphragm and a voice coil, the speaker base having a plurality of positioning units, the diaphragm being disposed at the speaker base, and the voice coil being connected to the diaphragm;

a magnetic member comprising a main magnetic plate and a magnetic unit, the magnetic unit being disposed on a top surface of the main magnetic plate, wherein the voice coil is movably disposed outside the magnetic unit;

an assembly-auxiliary frame having a plurality of aligning units and being disposed outside the magnetic member, the aligning units being coupled to the positioning units respectively to allow the assembly-auxiliary frame to be mounted on the speaker base; and a plurality of dampers symmetrically disposed between the main magnetic plate and the assembly-auxiliary frame.

2. The vibration damping loudspeaker of claim 1, wherein two short-side sides of the main magnetic plate each have a transverse short-side magnetic plate, allowing the dampers to be symmetrically disposed between the transverse short-side magnetic plates and two short-side sides of the assembly-auxiliary frame.

3. The vibration damping loudspeaker of claim 2, wherein the dampers each have a plurality of first fitting portions, whereas the assembly-auxiliary frame and the transverse short-side magnetic plates each have at least a second fitting portion, with the first fitting portions coupled to the second fitting portions respectively.

4. The vibration damping loudspeaker of claim 2, wherein two long-side sides of the main magnetic plate each have a longitudinal long-side magnetic plate.

5. The vibration damping loudspeaker of claim 2, wherein two short-side sides of the speaker base each have an electrically conductive sheet with a first electrode and a second electrode, the second electrode being disposed at a bottom of the speaker base, two short-side sides of the assembly-auxiliary frame each have a first dent, and the transverse short-side magnetic plates each have a second dent, the second electrodes being disposed at the first dents respectively, and the first dents being disposed at the second dents respectively.

6. The vibration damping loudspeaker of claim 1, further comprising at least a spider disposed between the speaker base and the voice coil.

7. The vibration damping loudspeaker of claim 1, wherein the main magnetic plate, the dampers and the assembly-auxiliary frame are integrally formed by injection molding.

8. The vibration damping loudspeaker of claim 1, wherein the dampers are made of silicone and have hardness of 40 to 60 degrees.

9. The vibration damping loudspeaker of claim 1, wherein rigidity of the assembly-auxiliary frame is greater than rigidity of the speaker base.

10. The vibration damping loudspeaker of claim 6, wherein the spiders are disposed between two short-side sides of the speaker base and two short-side sides of the voice coil and are symmetrically arranged, with the main magnetic plate having two longitudinal long-side magnetic plates, the dampers are disposed between the longitudinal long-side magnetic plates of the main magnetic plate and two long-side sides of the assembly-auxiliary frame, the assembly-auxiliary frame having two downward-concave short-side sides so as to be connected between the long-side sides of the assembly-auxiliary frame.

11. The vibration damping loudspeaker of claim 10, wherein the downward-concave short-side sides and the main magnetic plate lie at the same horizontal position.

12. The vibration damping loudspeaker of claim 10, wherein the dampers each have a first fitting unit and a second fitting unit, the longitudinal long-side magnetic plates of the main magnetic plate each have at least a third fitting unit, and the long-side sides of the assembly-auxiliary frame each have at least a fourth fitting unit, with the first fitting unit fitted to the third fitting unit, and the second fitting unit fitted to the fourth fitting unit.

13. The vibration damping loudspeaker of claim 10, wherein the longitudinal long-side magnetic plates of the main magnetic plate, the dampers and the long-side sides of the assembly-auxiliary frame are integrally formed by injection molding.

14. The vibration damping loudspeaker of claim 6, wherein the spiders are disposed between two short-side sides of the speaker base and two short-side sides of the voice coil and are symmetrically arranged, and the main magnetic plate has two longitudinal long-side magnetic plates and two transverse short-side magnetic plates, the transverse short-side magnetic plates being of a smaller thickness than the main magnetic plate, the assembly-auxiliary frame having two upward-convex short-side sides so as to be connected between two long-side sides of the assembly-auxiliary frame, and the dampers are disposed between the transverse short-side magnetic plates of the main magnetic plate and the upward-convex short-side sides of the assembly-auxiliary frame.

15. The vibration damping loudspeaker of claim 14, wherein the dampers each have a fifth fitting unit and a sixth fitting unit, the transverse short-side magnetic plates of the main magnetic plate each have a seventh fitting unit, and the upward-convex short-side sides of the assembly-auxiliary frame each have an eighth fitting unit, with the fifth fitting unit fitted to the seventh fitting unit, and the sixth fitting unit fitted to the eighth fitting unit.

16. The vibration damping loudspeaker of claim 14, wherein the transverse short-side magnetic plates of the main magnetic plate, the dampers and the upward-convex short-side sides of the assembly-auxiliary frame are integrally formed by injection molding.

* * * * *